United States Patent
Inukai (10) Patent No.: US 9,318,964 B2
(45) Date of Patent: Apr. 19, 2016

(54) POWER SUPPLY SYSTEM, IMAGE FORMING APPARATUS HAVING THE SAME, AND CONTROL METHOD OF THE SAME

(71) Applicant: BROTHER KOGYO KABUSHIKI KAISHA, Nagoya-shi, Aichi-ken (JP)

(72) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 761 days.

(21) Appl. No.: 13/629,511

(22) Filed: Sep. 27, 2012

(65) Prior Publication Data
US 2013/0113292 A1 May 9, 2013

(30) Foreign Application Priority Data
Nov. 9, 2011 (JP) .................. 2011-245775

(51) Int. Cl.
*G03G 15/00* (2006.01)
*H02M 3/335* (2006.01)

(52) U.S. Cl.
CPC ....... *H02M 3/33538* (2013.01); *G03G 15/5004* (2013.01); *G03G 15/80* (2013.01); *H02M 3/33561* (2013.01); *Y10T 307/707* (2015.04)

(58) Field of Classification Search
CPC ....... B23K 11/248; B23K 11/243; H02J 3/04; H01R 29/00; H02B 1/24; G03G 15/5004; G03G 15/80; H02M 3/33538; H02M 3/33561; Y10T 307/70
USPC .......................................... 307/112
See application file for complete search history.

(56) References Cited

U.S. PATENT DOCUMENTS 4,910,654 A * 3/1990 Forge ............................... 363/49
5,032,968 A * 7/1991 Mikami et al. .................. 363/37
(Continued)

FOREIGN PATENT DOCUMENTS

JP 62-064256 A 3/1987
JP 2-250670 A 10/1990
(Continued)

OTHER PUBLICATIONS

Office Action issued in corresponding U.S. Appl. No. 14/171,877, mailed Mar. 31, 2015.
(Continued)

*Primary Examiner* — Thienvu Tran
*Assistant Examiner* — Brian K Baxter
(74) *Attorney, Agent, or Firm* — Merchant & Gould P.C.

(57) ABSTRACT

A power supply system includes: a switching power supply configured to convert an AC voltage from an AC power supply into predetermined DC voltages, and outputs the DC voltages; a switch circuit provided on an AC input line, the switch circuit being configured to be switched on and off and supply AC power to the power supply when the switch circuit is turned on; a low-capacity power supply circuit connected to the AC input line at a front stage of the switch circuit, the low-capacity power supply circuit being configured to supply electric power to the switch circuit if the power supply is active and supply predetermined electric power if the power supply is not used; and a control device configured to receive the predetermined electric power from the low-capacity power supply circuit. When the power supply is not used, the control device turns off the switch circuit.

27 Claims, 4 Drawing Sheets

(56) References Cited

U.S. PATENT DOCUMENTS

| | | | |
|---|---|---|---|
| 5,231,309 A * | 7/1993 | Soma et al. | 307/125 |
| 5,659,371 A * | 8/1997 | Krause | 348/730 |
| 5,670,832 A | 9/1997 | Takeda | |
| 5,914,538 A | 6/1999 | Kurosawa et al. | |
| 6,115,266 A * | 9/2000 | Matsui et al. | 363/21.13 |
| 6,262,565 B1 | 7/2001 | Williams et al. | |
| 6,353,543 B2 * | 3/2002 | Itoh et al. | 363/21.01 |
| 6,408,148 B1 * | 6/2002 | Yamamoto | 399/88 |
| 6,476,589 B2 * | 11/2002 | Umminger et al. | 323/282 |
| 7,602,158 B1 * | 10/2009 | Iacob | 323/231 |
| 7,639,963 B2 | 12/2009 | Matsuo | |
| 8,503,900 B2 | 8/2013 | Inukai | |
| 2004/0190923 A1 | 9/2004 | Inukai | |
| 2008/0292351 A1 | 11/2008 | Matsuda et al. | |
| 2008/0309163 A1 * | 12/2008 | Hashimoto et al. | 307/31 |
| 2009/0060558 A1 | 3/2009 | Uehara | |
| 2009/0128347 A1 | 5/2009 | Bucella | |
| 2009/0168461 A1 * | 7/2009 | Nakahori | 363/17 |
| 2009/0180229 A1 | 7/2009 | Lee | |
| 2009/0230781 A1 * | 9/2009 | Hung et al. | 307/140 |
| 2010/0001695 A1 | 1/2010 | Arai et al. | |
| 2010/0060000 A1 | 3/2010 | Scholte-Wassink | |
| 2010/0122096 A1 * | 5/2010 | zenc | 713/300 |
| 2010/0256897 A1 * | 10/2010 | Takata et al. | 701/113 |
| 2011/0063759 A1 * | 3/2011 | Billingsley et al. | 361/1 |
| 2011/0064445 A1 | 3/2011 | Yashiro | |
| 2011/0110129 A1 * | 5/2011 | Busch | 363/53 |
| 2012/0025630 A1 * | 2/2012 | Tsuda | 307/125 |
| 2012/0060786 A1 * | 3/2012 | Okada et al. | 123/179.5 |
| 2012/0148273 A1 | 6/2012 | Shimura et al. | |
| 2012/0206057 A1 * | 8/2012 | Kim et al. | 315/201 |
| 2013/0028623 A1 | 1/2013 | Inukai | |
| 2013/0031396 A1 | 1/2013 | Inukai | |
| 2013/0038318 A1 | 2/2013 | Inukai | |
| 2013/0111237 A1 | 5/2013 | Inukai | |
| 2013/0113292 A1 | 5/2013 | Inukai | |
| 2013/0129373 A1 | 5/2013 | Inukai | |
| 2014/0210264 A1 | 7/2014 | Inukai | |
| 2014/0218827 A1 | 8/2014 | Inukai | |
| 2014/0218981 A1 | 8/2014 | Inukai | |
| 2014/0233266 A1 | 8/2014 | Inukai | |

FOREIGN PATENT DOCUMENTS

| | | |
|---|---|---|
| JP | 4-14486 U | 2/1992 |
| JP | 4-51260 A | 2/1992 |
| JP | H07-087734 A | 3/1995 |
| JP | H07-308065 A | 11/1995 |
| JP | H09-023638 A | 1/1997 |
| JP | 2001-005350 A | 1/2001 |
| JP | 2001-025163 A | 1/2001 |
| JP | 2004-151998 A | 5/2004 |
| JP | 2004-187391 A | 7/2004 |
| JP | 2004-274887 A | 9/2004 |
| JP | 2004-303469 A | 10/2004 |
| JP | 2006-129651 A | 5/2006 |
| JP | 2010-172149 A | 8/2010 |
| JP | 2010-239774 A | 10/2010 |
| JP | 2010-252574 A | 11/2010 |
| JP | 2011-120366 A | 6/2011 |
| JP | 2011-125132 A | 6/2011 |
| JP | 2011-199976 A | 10/2011 |
| JP | 2011-212951 A | 10/2011 |
| WO | 97-50165 A1 | 12/1997 |

OTHER PUBLICATIONS

Office Action issued in corresponding Japanese patent application No. 2011-245775, Jan. 20, 2015 (with partial English-language translation); 10 pages.

U.S. Office Action (Notice of Allowance) issued in related U.S. Appl. No. 14/169,487, Aug. 17, 2015.

U.S. Office Action (Notice of Allowance) issued in related U.S. Appl. No. 14/169,933, mailed Jul. 7, 2015.

U.S. Office Action issued in related U.S. Appl. No. 14/181,212, Jan. 21, 2016.

U.S. Office Action (Notice of Allowance) issued in related U.S. Appl. No. 14/171,877, Jan. 25, 2016.

* cited by examiner

POWER SUPPLY SYSTEM, IMAGE FORMING APPARATUS HAVING THE SAME, AND CONTROL METHOD OF THE SAME

CROSS-REFERENCE TO RELATED APPLICATION

This application is based upon and claims the benefit of priority of Japanese Patent Application No. 2011-245775 filed on Nov. 9, 2011, the contents of which are incorporated herein by reference in its entirety.

BACKGROUND

The present disclosure relates to a power supply system, an image forming apparatus having the power supply system, and a control method of the power supply system, and particularly, to a technology for reducing the power consumption of a power supply system.

As an example of technologies for reducing the power consumption of a power supply system, there is a known technology disclosed in Japanese Patent Application Laid-Open No. 7-087734. Japanese Patent Application Laid-Open No. 7-087734 discloses a technology in which, in a standby mode, a main power-supply control unit stops oscillation of an output transformer of a switching power supply and power supply to the main power-supply control unit is performed by a secondary battery, whereby the power consumption is reduced.

SUMMARY

However, even if the oscillation of the switching power supply is stopped as in Japanese Patent Application Laid-Open No. 7-087734, a leakage current flows in a smoothing electrolytic capacitor or the like provided on the primary side of the output transformer. For this reason, there is room for further reducing the power consumption in the switching power supply.

An object is to provide a technology capable of further reducing power consumption in a power supply.

Aspects of the present disclosure provide the following arrangements:

A power supply system comprising:

a switching power supply configured to convert an AC voltage from an AC power supply into predetermined DC voltages, and outputs the DC voltages;

a switch circuit provided on an AC input line, the switch circuit being configured to be switched on and off and supply AC power to the switching power supply when the switch circuit is turned on;

a low-capacity power supply circuit connected to the AC input line at a front stage of the switch circuit, the low-capacity power supply circuit being configured to supply electric power to the switch circuit if the switching power supply is active and supply predetermined electric power if the switching power supply is not used; and a control device configured to receive the predetermined electric power from the low-capacity power supply circuit, wherein when the switching power supply is not used, the control device turns off the switch circuit to stop supply of the AC power to the switching power supply.

A control method of a power supply system which includes: a switch circuit that is provided on an AC input line; a low-capacity AC to DC converter circuit connected to the AC input line at a front stage of the switch circuit, and including a capacitor; and a switching power supply that is provided at a subsequent stage of the switch circuit, the method comprising:

turning on the switch circuit by energy accumulated in the capacitor, to turn on the switching power supply if a power supply is applied to the power supply system;

turning off the switch circuit in a case where it is required to turn off the switching power supply temporarily for a predetermined period after the input of the power supply; and generating a predetermined DC voltage by the low-capacity AC to DC converter circuit during the predetermined period.

A power supply system configured to supply a predetermined DC power to an external device which has a normal-mode in which the external device receives the predetermined DC power from the power supply system and a sleep mode in which the external device stops receiving the predetermined DC power from the power supply system, the normal mode and the sleep mode being changed to one another according to a signal received from an external, the power supply system comprising:

a power converter configured to convert an AC power supplied from an AC power supply into the predetermined DC power for supplying the external device;

a switch circuit coupled to the AC power supply and the power converter and configured to:
  connect the AC power supply and the power converter in a ON mode, the switch circuit requiring a power supply to keep the ON mode;
  disconnect the AC power supply and the power converter in a OFF-mode, a control device configured to change the switch circuit to the ON mode or the OFF mode in response to a signal received from the external; and a low-capacity power supply circuit coupled to the AC power supply and configured to supply predetermined electric power to the control device, wherein when the control device receives a signal to change the power supply system in the normal-mode, the control device supplies power to the switch circuit to keep the switch circuit in the ON mode and keep connecting the AC power supply and the power converter, and wherein when the control device receives a signal to change the power supply system in the sleep-mode, the control device stops supplying power to the switch circuit to keep the switching circuit in the OFF mode and keep disconnecting the AC power supply and the power converter.

According to the present disclosure, when the power supply system is not used, the supply of the AC power to the switching power supply is completely cut off, whereby it is possible to suppress a leakage current. Therefore, it is possible to further reduce the power consumption when the power supply system is not used.

DESCRIPTION OF EXEMPLARY EMBODIMENTS

An embodiment of the aspect of the present disclosure will be described with reference to FIGS. 1 and 2.

1. Description of Printer

Figure 1:
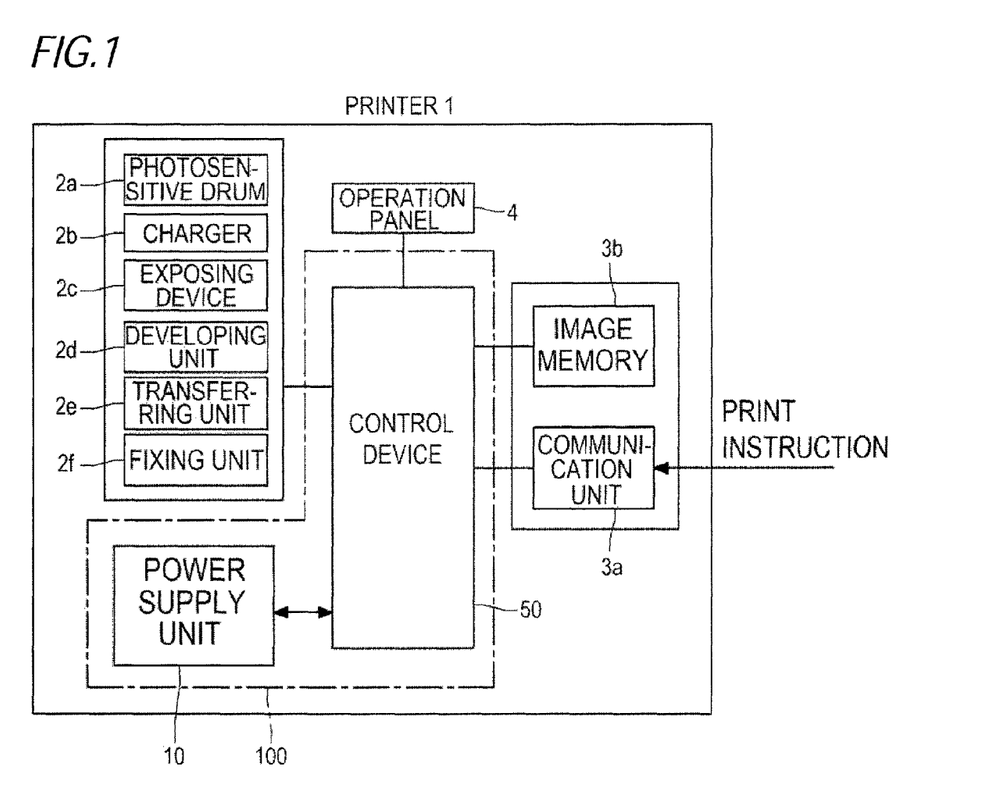
FIG. 1 is a block diagram illustrating a schematic configuration of an image forming apparatus according to an embodiment.
Figure 2:
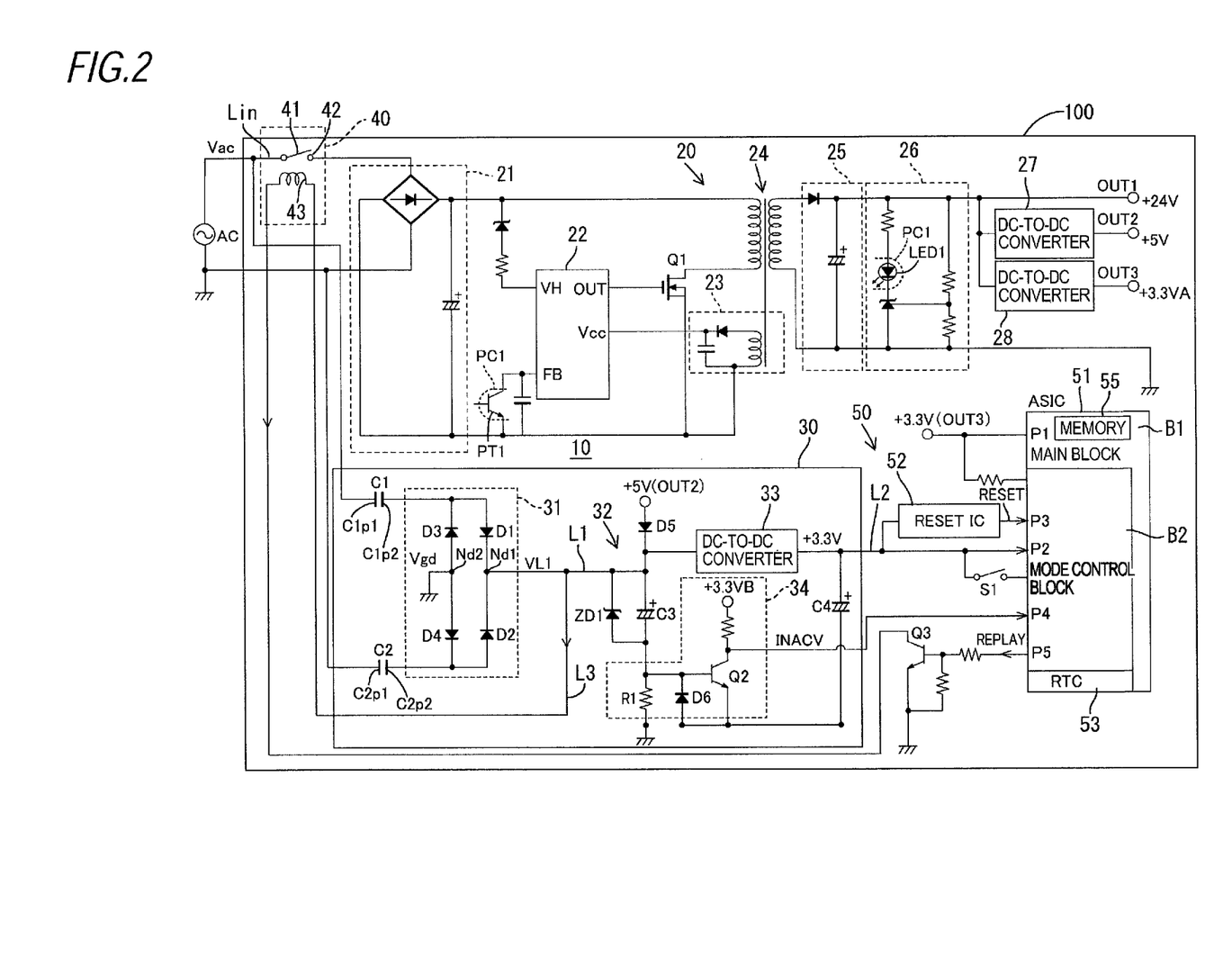
FIG. 2 is a block diagram illustrating a schematic configuration of a power supply system according to the embodiment.

FIG. 1 is a block diagram illustrating the electrical configuration of a printer 1 which is an example of an image forming apparatus. The printer 1 includes a printing unit 2, a communication unit 3a, an image memory 3b, and a power supply system 100. The power supply system 100 includes a power supply unit 10 and a control device 50. The power supply unit 10 acts as a power supply of the printer 1, and supplies electric power to the printing unit 2, the communication unit 3a, the image memory 3b, and the control device 50.

The printing unit 2 includes a photosensitive drum 2a, a charger 2b for performing a charging process of charging the surface of the photosensitive drum 2a, an exposing device 2c for performing an exposing process of forming an electrostatic latent image on the surface of the photosensitive drum 2a, a developing unit 2d for performing a developing process of attaching a developer to the electrostatic latent image formed on the surface of the photosensitive drum 2a such that a developer image is formed, a transfer unit 2e for performing a transfer process of transferring the developer image onto a recording medium, and a fixing unit 2f for performing a fixing process of fixing the developer image transferred on the recording medium.

The printing unit 2 performs a printing process of performing the charging process, the exposing process, the developing process, the transfer process, and the fixing process so as to print an image based on print data on a recording medium. The communication unit 3a performs communication with an information terminal device such as a PC, and has a function of receiving print instructions and print data from the information terminal device. The image memory 3b temporarily stores print data received from the information terminal device.

The manual operation panel 4 includes a plurality of operation buttons and the like, and operation instructions such as a copy instruction are given to the printer 1 by operation of a user on the operation panel 4.

If the communication unit 3a receives a print instruction from the information terminal device and receives print data, in the printer 1, the control device 50 controls the printing unit 2 such that the printing unit 2 performs the printing process of performing the charging process, the exposing process, the developing process, the transfer process, and the fixing process so as to print an image based on print data on a recording medium. The operating voltage of the printing unit 2 is generally 24V, whereas the operating voltages of the communication unit 3a, the image memory 3b, and the control device 50 are generally 3.3V Also, the printer 1 has a normal mode and an off mode, as operation modes. The normal mode is a mode in which the printer 1 is in a state in which the printer 1 can perform the printing process immediately in response to a print instruction or is performing the printing process. Therefore, in the normal mode, the power supply system 100 operates, and thus supply of electric power to the fixing unit 2f is controlled such that the fixing unit 2f is maintained at a temperature at which fixing is possible or a temperature slightly lower than the temperature at which fixing is possible. The OFF mode is a mode in which the printer 1 is a mode which the printer 1 enters if any print instruction is not received for a predetermined period, and in which the printer 1 is in a standby state. In the OFF mode, the power supply system 100 operates only partially, and thus electric power is not supplied to the fixing unit 2f.

Also, the OFF mode is a mode in which power consumption is less than in a so-called sleep mode, and in the OFF mode, electric power is not supplied to the communication unit 3a, and thus data communication with the outside is impossible.

2. Configuration of Power Supply System

Next, the configuration of the power supply system 100 will be described with reference to FIG. 2. As described above, the power supply system 100 includes the power supply unit 10 and the control device 50. First, the configuration of the power supply unit 10 of the power supply system 100 will be described. The power supply unit 10 includes a switching power supply 20, a low-capacity power supply circuit 30, and a relay 40.

The relay 40 is an example of a switch circuit, and includes a movable piece 41, a contact 42, and a relay coil (an example of switching unit) 43 for driving the movable piece 41. Here, the contact 42 is a normally open contact. In other words, in a case where the relay coil 43 is not excited, the movable piece 41 is not connected to the contact 42, and thus the relay 40 is in an OFF state. Meanwhile, if the relay coil 43 is excited, the movable piece 41 is connected to the contact 42, and thus the relay 40 becomes an ON state such that AC power is supplied to the switching power supply 20.

The switch circuit is not limited to the relay 40, but may be a so-called self-holding type switch circuit which holds an ON state without power supply. For example, the switch circuit may be a self-holding type relay or a self-holding type solenoid. In a case where the switch circuit is a self-holding type solenoid, when the movable piece 41 is in the OFF state, the coil of the solenoid is excited and thus the solenoid operates. As a result, the movable piece 41 is switched from the OFF state to the ON state and the ON state of the movable piece 41 continues. Also, when the movable piece 41 is in the ON state, the coil of the solenoid is excited and thus the solenoid operates such that the movable piece 41 is switched from the ON state to the OFF state and the OFF state of the movable piece 41 continues. In this case, it is unnecessary to always excite the coil for holding the ON state. Therefore, it is possible to reduce the power consumption as compared to a case where the relay 40 is not a self-holding type. Alternatively, the switch circuit may be a semiconductor switch having no mechanical contacts.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC to DC converters 27 and 28. The switching power supply 20 is connected to an AC input line Lin through the relay 40.

In the normal mode, the switching power supply 20 rectifies and smoothes an AC voltage Vac of an AC power supply AC so as to generate DC voltages of +24V, +5V, and +3.3V. The DC voltage of +24V (hereinafter, referred to as DC 24V) is output from a first output terminal OUT1, the DC voltage of +5V (hereinafter, referred to as DC 5V) is output from a second output terminal OUT2, and the DC voltage of +3.3V (hereinafter, referred to as DC 3.3V) is output from a third output terminal OUT3.

The rectifying/smoothing circuit 21 is a so-called capacitor input type, and includes a photodiode for rectifying the AC voltage Vac (for example, 240V) of the AC power supply AC, and a capacitor for smoothing the rectified voltage. An output of the rectifying/smoothing circuit 21 is applied to a primary coil of the transformer 24.

The transistor Q1 is an N-channel MOSFET, and is turned on or off in response to an on/off signal (PWM signal) given to the gate of the transistor Q1 by the control IC 22. According to this switching operation of the transistor Q1, the primary side of the transformer 24 oscillates, and thus a voltage is induced on a secondary coil of the transformer 24.

Also, on the primary side of the transformer 24, the voltage generating circuit 23 is provided. The voltage generating circuit 23 rectifies and smoothes a voltage induced on an auxiliary coil provided on the primary side of the transformer 24, thereby generating a power supply voltage Vcc for the control IC 22.

The rectifying/smoothing circuit 25 rectifies and smoothes the voltage induced on the secondary coil of the transformer 24, thereby generating the DC 24V.

The voltage detecting circuit 26 includes a photocoupler PC1, and makes a light emitting diode LED1 of the photocoupler PC1 emit light in response to the detected level of the DC 24V output of the switching power supply 20. The photocoupler PC1 includes a phototransistor PT1 connected to a feedback port FB of the control IC 22. Therefore, a light signal of the light emitting diode LED1 is converted into an electric signal by the phototransistor PT1, and the detected value of the DC 24V output is fed back to the feedback port FB of the control IC 22.

The DC to DC converter 27 converts DC 24V into DC 5V and outputs DC 5V, and the DC to DC converter 28 converts DC 24V into DC 3.3V and outputs DC 3.3V.

In an output mode, the control IC 22 oscillates the primary side of the transformer 24, thereby generating to generate DC voltages. In an output stop mode, the relay 40 is turned off, and thus the power supply to the control IC 22 is cut off such that the control IC 22 stops the operation. Therefore, in the output stop mode, the DC voltages are not output from the switching power supply 20. Also, when the printer 1 returns from the OFF mode to the normal mode, the relay 40 is turned on so as to restart the power supply to the control IC 22, and thus the oscillation of the primary side of the transformer 24 restarts. As a result, the DC voltages are output from the switching power supply 20. Here, the OFF mode and the normal mode of the printer 1 correspond to the output stop mode and the output mode of the switching power supply 20. Also, during start-up of the switching power supply 20, a power supply voltage is supplied to an input port VH.

Next, the configuration of the control device 50 of the power supply system 100 will be described. The control device 50 includes an application-specific integrated circuit (ASIC) 51, a reset IC 52, and a relay driving transistor (an example of a driving circuit) Q3. The ASIC 51 includes a main block B1 for controlling the printing unit 2 of the printer 1, and a mode control block B2 for mainly controlling the mode of the printer 1. A portion of the mode control may be performed by the main block B1. The main block B1 and the mode control block B2 are not necessarily configured by the ASIC 51. For example, the main block B1 and the mode control block B2 may be configured by a main CPU and a sub CPU.

A power supply port P1 of the main block B1 receives DC 3.3V from the DC to DC converter 28 of the switching power supply 20. Also, the main block B1 is subjected to power supply only in the normal mode, such that the main block B1 becomes an operation state, and if the switching power supply 20 transitions to the output stop mode, that is, the OFF mode, the supply of power to the main block B1 is cut off such that the main block B1 becomes a stop state. The transition to the OFF mode is performed if the user operates the operation panel 4 so as to turn off a switch S1 or the sleep mode continues for a predetermined period or more (see FIG. 4). Also, the main block B1 includes a real time block (RTC) 53, and a memory 55. The RTC 53 is used for time measurement when it is determined whether electric power necessary for driving the relay 40 has been accumulated in the low-capacity power supply circuit 30. The memory 55 includes a ROM and a RAM. The ROM stores various programs to be executed by the ASIC 51, and the RAM stores various kinds of data when the programs are executed.

Meanwhile, a power supply port P2 of the mode control block B2 is connected to the DC to DC converter 33 of the low-capacity power supply circuit 30, and is subjected to power supply from the low-capacity power supply circuit 30 in the normal mode and the OFF mode. The mode control block B2 controls the switching power supply 20 according to the mode switching of the printer 1 such that the switching power supply 20 is switched between the normal mode and the OFF mode. The normal mode corresponds to when the switching power supply 20 is used, and the OFF mode corresponds to when the switching power supply 20 is not used.

In the present embodiment, when the switching power supply 20 is not used, the mode control block B2 controls the relay 40 such that the relay 40 becomes the OFF state so as to stop power supply to the switching power supply 20. Specifically, in the normal mode, the mode control block B2 turns on the relay driving transistor Q3 by a RELAY signal, whereby a current is supplied from the low-capacity power supply circuit 30 to the relay coil 43. Therefore, the relay coil 43 is excited and thus the relay 40 is turned on. As a result, AC power is supplied to the switching power supply 20. Meanwhile, in the OFF mode, according to the RELAY signal, the relay driving transistor Q3 is turned off, whereby the excitation of the relay 40 is stopped, and thus the relay 10 is turned off. As a result, the power supply to the switching power supply 20 is cut off.

In other words, the mode control block B2 controls the relay 40 such that the relay 40 is turned on or off, thereby switching the switching power supply 20 between the output mode and the output stop mode. Here, the output mode is a mode in which the primary side of the transformer 24 is made oscillate such that the switching power supply 20 becomes an output state, and corresponds to the normal mode. Meanwhile, the output stop mode is a mode in which the oscillation of the transformer 24 is stopped such that the output of the switching power supply 20 is stopped, and corresponds to the OFF mode of the printer 1. As described above, in the OFF mode, since the output of the switching power supply 20 is stopped, the control device 50, that is, the mode control block B2 of the ASIC 51 is subjected to power supply from the low-capacity power supply circuit 30.

The reset IC 52 generates the RESET signal according to a detected value of an output voltage (DC +3.3 VB) of the DC to DC converter 33 of the low-capacity power supply circuit 30, and outputs the RESET signal to a port P3 of the mode control block B2 such that the mode control block B2 is reset or the reset of the mode control block B2 is released, according to the RESET signal. Specifically, in a case where the DC +3.3 VB is lower than a predetermined voltage, the reset IC 52 generates the RESET signal to reset the mode control block B2. Meanwhile, in a case where the DC +3.3 VB is equal to or higher than a predetermined voltage, the reset IC 52 generates the RESET signal to release the reset of the mode control block B2. Alternatively, the reset IC 52 may generate the RESET signal on the basis of a detected value of an input voltage of the DC to DC converter 33, that is, a first line voltage VL1.

As described above, in a case of switching from the OFF mode to the normal mode, the control unit 50, specifically, the mode control block B2 of the ASIC 51 generates the RELAY signal according to electric power which is supplied from the low-capacity power supply circuit 30 such that the relay 40 is turned on by the RELAY signal. Therefore, it is possible to appropriately perform switching from the OFF mode to the normal mode using electric power accumulated during the OFF mode.

Also, the user can use a switch S1 to instruct the mode control block B2 to perform mode switching. For example, if the switch S1 is switched on, transition to the normal mode is performed, and if the switch S1 is switched off transition to the OFF mode is performed.

3. Configuration of Low-Capacity Power Supply Circuit

Next, the low-capacity power supply circuit 30 will be described. The low-capacity power supply circuit 30 supplies power to the control unit 50 in the OFF mode and the normal mode. Specifically, in each mode, the low-capacity power supply circuit 30 supplies electric power to the mode control block B2 of the control unit 50 and the reset IC 52. In the normal mode, according to the amplitude of the AC voltage Vac, the low-capacity power supply circuit 30 supplies electric power from the AC power supply AC to the control device 50, or supplies electric power from DC 5V of the switching power supply 20 to the control device 50 through a diode D5. In the power saving mode, the low-capacity power supply circuit 30 supplies electric power from a smoothing capacitor C3 to the control device 50.

The low-capacity power supply circuit 30 includes a first capacitor C1, a second capacitor C2, a rectifier circuit 31, a smoothing circuit 32, the DC to DC converter 33, a power detecting circuit 34, and a second accumulating capacitor C4.

The first capacitor C1 includes a first electrode $C1p1$ and a second electrode $C1p2$, the first electrode $C1p1$ is connected to one end of the AC power supply AC through the AC input line Lin, and the second electrode $C1p2$ is connected to the rectifier circuit 31.

Also, the second capacitor C2 includes a first electrode $C2p1$ and a second electrode $C2p2$, the first electrode $C2p1$ is connected to the other end of the AC power supply AC, and the second electrode $C2p2$ is connected to the rectifier circuit 31.

The rectifier circuit 31 is electrically connected between the second electrode $C1p2$ of the first capacitor C1 and the second electrode of the second capacitor C2, and rectifies the AC voltage Vac applied to the first and second capacitors C1 and C2. In the first embodiment, the rectifier circuit 31 is configured by abridge circuit composed of four diodes D1, D2, D3, and D4. The cathodes of the diode D1 and the diode D2 are connected at a first contact node Nd1, the anode of the diode D1 is connected to the second electrode $C1p2$ of the first capacitor C1, and the anode of the diode D2 is connected to the second electrode $C2p2$ of the second capacitor C2.

Further, the anodes of the diode D3 and the diode D4 are connected at a second contact node Nd2, the cathode of the diode D3 is connected to the second electrode $C1p2$ of the first capacitor C1, and the cathode of the diode D4 is connected to the second electrode $C2p2$ of the second capacitor C2. The second contact node Nd2 is connected to a ground. The configuration of the rectifier circuit 31 is not limited to the configuration of FIG. 2.

The smoothing circuit 32 is connected to the rectifier circuit 31 through a first voltage line L1, and smoothes the rectified AC voltage, thereby generating a first line voltage VL1. In the present embodiment, the smoothing circuit 32 includes a first accumulating capacitor C3 and a zener diode ZD1. During activation of the switching power supply 20, since the relay 40 is turned on, the first line voltage VL1, that is, electric power is supplied from the first accumulating capacitor C3 to the relay coil 43 through a relay driving line L3. However, the present invention is not limited thereto. The relay driving line L3 may be connected to the output side of the DC to DC converter 33, that is, a second line voltage VL2 such that electric power is supplied from the second accumulating capacitor C4 to the relay coil 43 through the relay driving line L3.

The first accumulating capacitor C3 is electrically connected to an output terminal (second output terminal) OUT2 of +5V of the switching power supply 20 through the diode D5. For this reason, after activation of the switching power supply 20, the first accumulating capacitor C3 and the second accumulating capacitor C4 can be charged by the DC voltage of +5V of the switching power supply 20. Therefore, after the activation of the switching power supply 20, even if the printer 1 enters the OFF mode in a short time, for this short time, the first accumulating capacitor C3 and the second accumulating capacitor C4 are charged, and thus the printer 1 can immediately return the OFF mode to the normal mode by the electric power of the first accumulating capacitor C3 or the second accumulating capacitor C4. Also, in the present embodiment, during the returning to the normal mode, the relay 40 is turned on by the electric power of the first accumulating capacitor C3, and thus the switching power supply 20 is reactivated.

The diode D5 is for preventing a backward flow from the first accumulating capacitor C3 to the DC to DC converter (33) side. Also, the zener diode ZD1 is for suppressing the first line voltage VL1 from rising in a case where the AC voltage Vac of the AC power supply AC rises. The zener diode ZD1 is not essential, and may be omitted.

The DC to DC converter 33 converts the first line voltage VL1 into DC +3.3V (hereinafter, referred to as DC 3.3 VB) which is the second line voltage VL2. The second line voltage VL2 is supplied to the reset IC 52 and the power supply port P2 of the mode control block B2. In other words, the mode control block B2 receives power supply from the low-capacity power supply circuit 30. The second accumulating capacitor C4 is charged by DC 3.3 VB from the DC to DC converter 33. If the capacitances of the first accumulating capacitor C3 and the second accumulating capacitor C4 are appropriately selected, in the OFF mode, it is possible to accumulate an amount of electric power according to a required predetermined voltage.

The DC to DC converter 33 and the second accumulating capacitor C1 are not essential, and according to an amount of electric power required in the OFF mode, the DC to DC converter 33 and the second accumulating capacitor C4 may be omitted. In this case, the driving power for the relay 40 is supplied from the first accumulating capacitor C3.

Also, the power detecting circuit 34 is connected between the first accumulating capacitor C3 and the ground, and detects whether an AC power supply Vac is being input to the AC input line Lin. The power detecting circuit 34 includes a transistor Q2, a resistor R1, and a diode D6, for instance. The collector of the transistor Q2 is pulled up to the DC 3.3 VB through another resistor. The base of the transistor Q2 is connected to one end of the resistor R1 and the cathode of the diode D6, and the emitter of the transistor Q2 is connected to the ground. The power detecting circuit 34 is an example of a cutoff detecting circuit. Any one of the resistor R1 and the diode D6 may be omitted.

According to the input of the AC voltage VC, a predetermined base current flows in the transistor Q2 such that the transistor Q2 is turned on. Meanwhile, if the predetermined base current does not flow in the transistor Q2, the transistor Q2 is turned off. An AC detection signal INACV having a pulse width corresponding to an ON period of the transistor Q2 is generated, and is supplied to a port P4 of the mode control block B2. According to the AC detection signal INACV, the mode control block B2 detects existence or non-existence of the AC power supply VC, generates the RELAY signal according to the detection result, and outputs the RELAY signal to the transistor Q3.

Specifically, if the AC power supply VC is applied and an AC voltage periodically exceeds a predetermined level, the transistor Q2 is periodically turned on, and thus the AC detection signal INACV periodically transitioning to a low level is generated. Meanwhile, if the AC power supply VC is cut off, the transistor Q2 is not turned on, and thus the AC detection signal INACV held at a high level is generated. In a case where the AC power supply VC is applied and the switching power supply 20 is used, the mode control block B2 generates the RELAY signal to turn on the transistor Q3.

Meanwhile, while the switching power supply 20 is being used, if the AC power supply VC is cut off, for example, if a power outage occurs, the mode control block B2 generates the RELAY signal to turn off the transistor Q3 such that the relay 40 is turned off. In this case, due to the cutoff of the AC power supply VC, it becomes impossible to maintain the ON state of the relay 40 with the electric power from the switching power supply 20. Instead, it is possible to turn off the relay 40, thereby suppressing the electric power of the low-capacity power supply circuit 30 from being consumed for maintaining the ON state of the relay 40 although it is unnecessary to maintain the ON state of the relay 40. Therefore, it is possible to maintain the charging of the low-capacity power supply circuit 30, and when the power supply is restored or turned on in future, it is possible to hasten the rising of the switching power supply 20.

4. Relay Control Process

Figure 3:
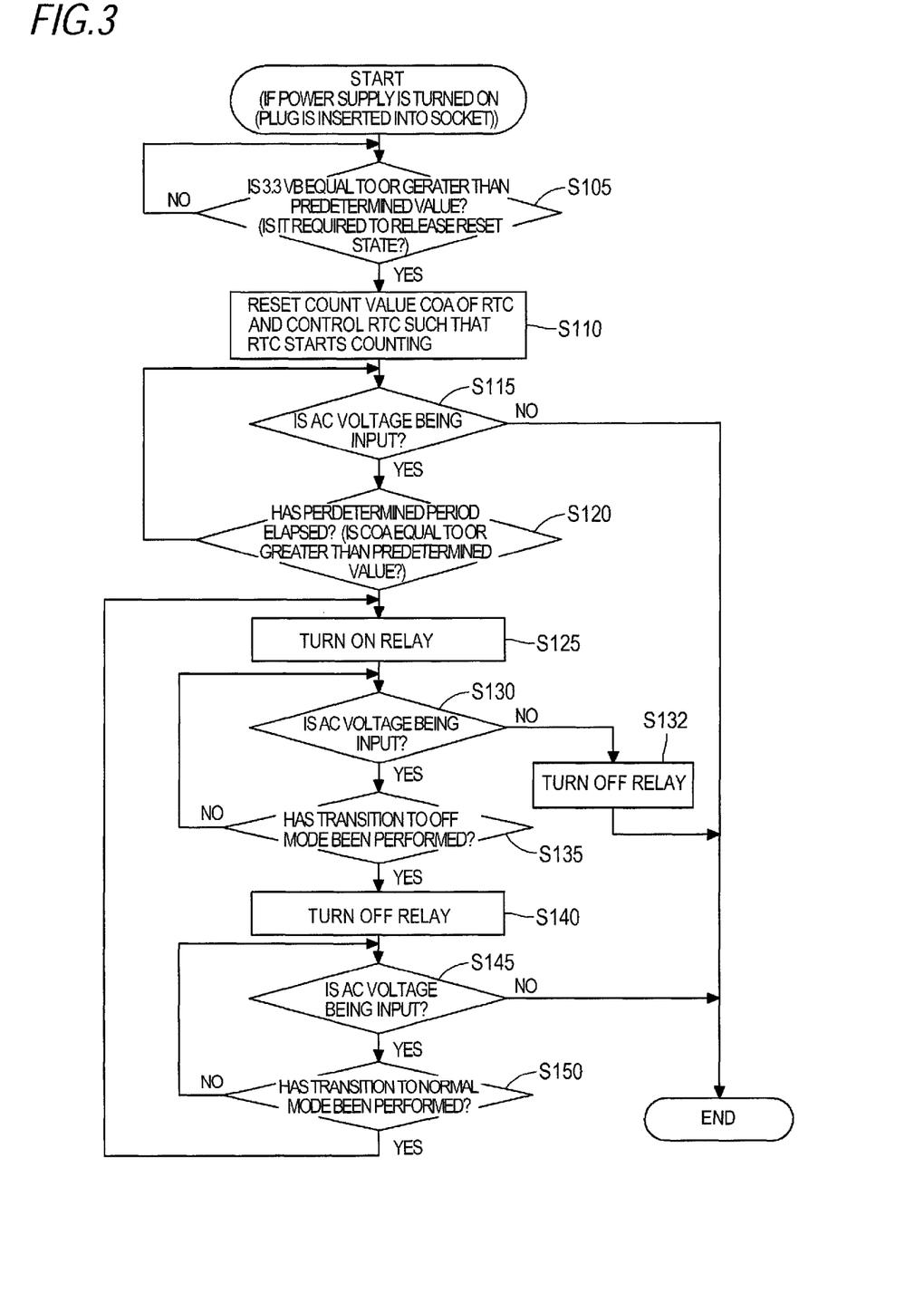
FIG. 3 is a flow chart schematically illustrating a relay control process in the power supply system.
Figure 4:
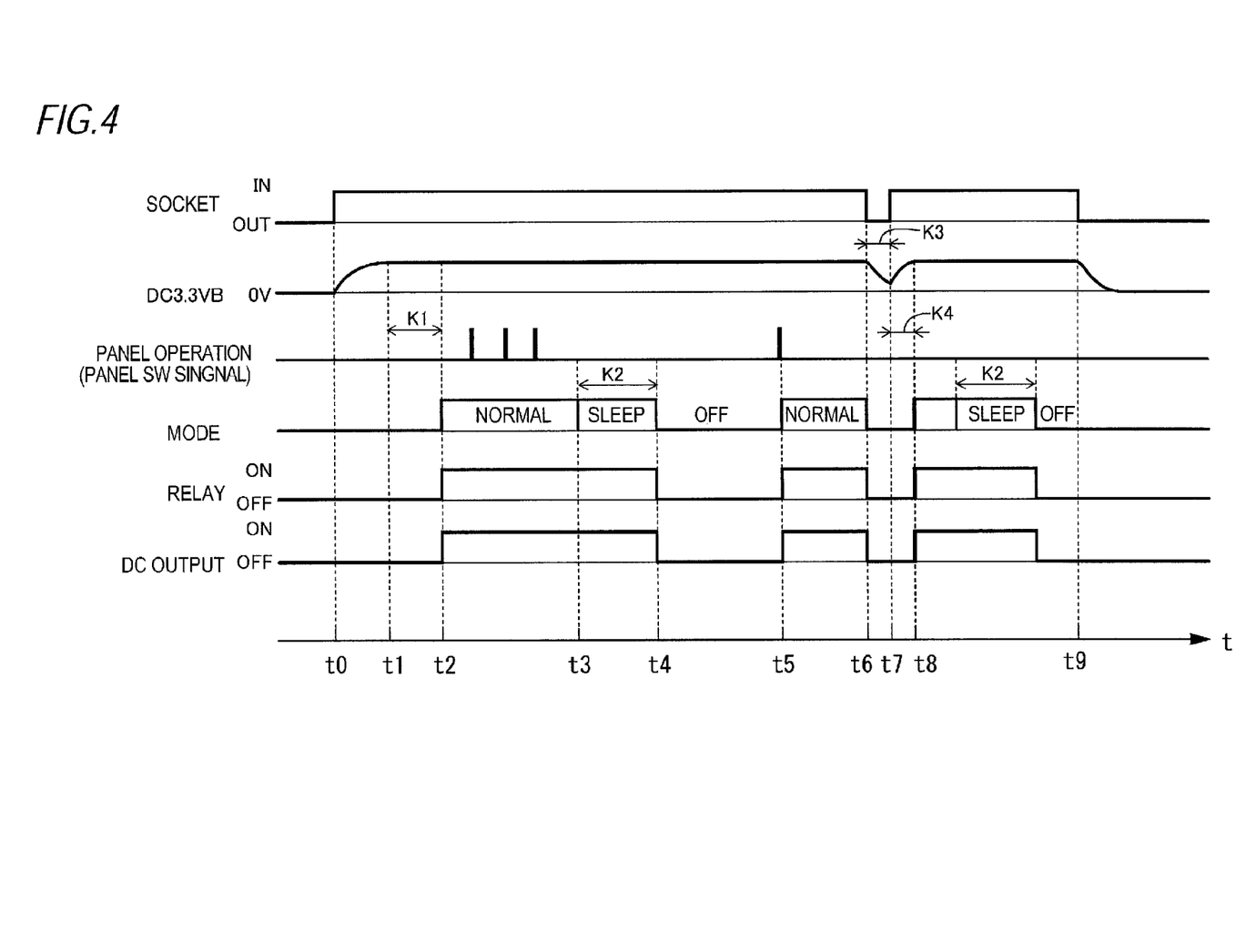
FIG. 4 is a schematic timing chart according to the relay control process.

Next, a control process of the relay 40 will be described with reference to FIGS. 3 and 4. FIG. 3 is a flow chart illustrating each process of the relay control process, and FIG. 4 is a timing chart relating to the relay control process.

If the plug of the printer 1 is inserted into a socket (corresponding to a timing t0 of FIG. 4), the relay control process is performed according to a predetermined program by the control device 50, specifically, the mode control block B2 of the control device 50.

First, in STEP S105, the control device 50 determines whether the DC 3.3 VB which is the output voltage of the DC to DC converter 33 is equal to or greater than a predetermined value. In other words, the control device 50 determines whether the DC 3.3 VB has reached the predetermined value or more, and the RESET signal from the reset IC is a signal to release the reset state of the mode control block B2. In a case of determining that the DC 3.3 VB is equal to or greater than the predetermined value (YES in STEP S105), in STEP S110, the control device 50 resets a count value COA of the RTC 53, and controls the RTC 53 such that the RTC 53 starts counting. This timing corresponds to a timing t1 of FIG. 4.

Next, in STEP S115, the control device 50 determines whether the AC voltage is being input, on the basis of the AC detection signal INACV from the power detecting circuit 34. In a case of determining that the AC voltage is not being input (NO in STEP S115), the control device 50 determines that the AC power supply VC has been cut off due to some reason, for example, a power outage, and terminates the present process (see a timing t9 of FIG. 4).

In this case, the control device 50 does not turn on the relay 40. Therefore, due to the cutoff of the AC power supply, it becomes impossible to control the relay 40 by electric power from the switching power supply 20 such that it is possible to suppress the electric power of the low-capacity power supply circuit 30 from being consumed for controlling the relay 40. In this way, it is possible to maintain accumulating of the low-capacity power supply circuit 30. Therefore, it is possible to hasten the rising of the switching power supply 20 when the supply of electric power to the printer 1 is restarted, for example, the plug of the printer 1 is inserted into a socket in a short period from the timing of cutoff of the AC power supply (see timings t7 to t8 of FIG. 4).

Meanwhile, in a case of determining that the AC voltage is being input (YES in STEP S115), the control device 50 determines that the DC 3.3 VB is equal to or greater than the predetermined value (the timing t1), and determines whether a predetermined period K1 has elapsed after the determination, that is, whether the count value COA of the RTC 53 has reached a predetermined value, in STEP S120.

This determination is performed for determining whether electric power necessary for driving the relay 40 has been accumulated in the low-capacity power supply circuit 30, that is, whether an amount of electric charge of the first accumulating capacitor C3 or the second accumulating capacitor C4 is sufficient. Also, in the present embodiment, the process of STEP S120 is performed for determining whether an amount of electric charge of the first accumulating capacitor C3 is sufficient. In a case of determining that the predetermined period K1 has elapsed (YES in STEP S120), the control device 50 generates the RELAY signal to turn on the transistor Q3, thereby turning on the relay 40, in STEP S125. If the relay 40 is turned on, the switching power supply 20 is activated. This timing corresponds to a timing t2 of FIG. 4. In other words, if the power supply is applied to the printer 1, that is, the power supply system 100, the relay 40 is turned on by energy accumulated in the first accumulating capacitor C3, and thus the switching power supply is turned on.

As described above, in the present embodiment, the control device 50 determines whether electric power (electric charge) necessary for controlling the relay 10 has been accumulated in the low-capacity power supply circuit 30, and turns on the relay 40 if the electric power of the low-capacity power supply circuit 30 is sufficient. Therefore, it is possible to certainly control the relay 40. In other words, in a case where a predetermined amount of electric power is necessary for driving the relay coil 43 of the relay 40, if it is confirmed that the predetermined amount of electric power (electric charge) has been accumulated, it is possible to certainly the relay coil 43.

Also, in the present embodiment, if the switching power supply 20 is activated, the switching power supply 20 supplies electric power to the relay 40, thereby maintaining the ON state of the relay 40. Specifically, DC 5V from the second output terminal OUT2 of the switching power supply 20 is supplied to the anode of the diode D5 of the low-capacity power supply circuit 30, and electric power is supplied to the relay coil 43 through the relay driving line 13. Therefore, it is possible to set the power capacity of the low-capacity power supply circuit 30 to be small. In other words, it is possible to miniaturize the low-capacity power supply circuit 30.

After the activation of the switching power supply 20, in STEP S130, once again, the control device 50 determines whether the AC voltage is being input. In a case of determining that the AC voltage is not being input (NO in STEP S130), the control device 50 determines that the AC power supply VC has been cut off for some reason (see a timing t6) and turns off the relay 40 in STEP S132. Then, the control device 50 terminates the present process. Meanwhile, in a case of determining that the AC voltage is being input (YES in STEP S130), in STEP S135, the control device 50 determines whether transition to the OFF mode has been performed. For example, the determination on whether transition to the OFF mode has been performed may be performed by determining whether the switch S1 has been turned off, that is, the OFF mode has been selected by operation of the user on the operation panel 4. Alternatively as shown in FIG. 1, in a case where after printing according to a print instruction (panel SW signal) by operation on the operation panel is completed, if any print data is not received and any operation instruction such as a print instruction is performed by the user for a predetermined period, and thus the printer 1 transitions to the sleep mode (see a timing t3), the determination on whether transition to the OFF mode has been performed may be performed by determining whether the sleep mode has continued for a predetermined period K2. The panel SW signal shown in FIG. 4 is generated according to operation of the user on the operation panel 4.

In a case of determining that transition to the OFF mode has been performed (YES in STEP S135), in STEP S140, the control device 50 generates the RELAY signal to turn off the transistor Q3, thereby turning off the relay 40. If the relay 40 is turned off, the supply of electric power to the switching power supply 20 is cut off, and thus the operation of the switching power supply 20 completely stops (corresponding to a timing t4 of FIG. 4). Therefore, in the OFF mode, a leakage current does not flow in the smoothing electrolytic capacitor of the rectifying/smoothing circuit 21 and the like provided on the primary side of the output transformer 24.

After the stop of the switching power supply 20, in STEP S145, once again, the control device 50 determines whether the AC voltage is being input. In a case of determining that the AC voltage is not being input (NO in STEP S145), the control device 50 determines that the AC power supply VC has been cut off for some reason, and terminates the present process. Meanwhile, in a case of determining that the AC voltage is being input (YES in STEP S145), in STEP S150, the control device 50 determines whether transition to the normal mode has been performed. For example, the determination on whether transition to the normal mode has been performed may be performed by determining whether the switch S1 has been turned on by operation of the user on the operation panel 4, or the like.

In a case of determining that transition to the normal mode has been performed due to turning on of the switch S1 (YES in STEP S150), the control device 50 returns to STEP S125 in which the control device 50 turns on the relay 40, thereby reactivating the switching power supply 20. This timing corresponds to a timing t5 of FIG. 4. At this time, since a sufficient amount of electric charge for driving the relay 40 has been secured in the first accumulating capacitor C3 of the low-capacity power supply circuit 30, it is possible to immediately reactivate the switching power supply 20.

5. Effects of Present Embodiment

When the switching power supply 20 is not used, for example, when the printer is in the OFF mode, the relay 40 is turned off, whereby the supply of AC power to the switching power supply 20 is completely cut off. Therefore, it is possible to suppress a leakage current on the primary side of the transformer 24, and to further reduce the power consumption when the switching power supply 20 is not used.

OTHER EMBODIMENTS

The present invention is not limited to the embodiments described with reference to the drawings, but, for example, the following embodiments are included in the technical scope of the present invention.

(1) In the above-mentioned embodiment, after the switching power supply is activated, if the switch circuit (the relay 40) is turned off and then it is immediately required to use the switching power supply, the control device 50 may determine that electric charge has been accumulated. In the case where it is required not to use the switching power supply immediately after the supply of AC power is cut off, the low-capacity power supply circuit 30 can be considered as having been charged. In this case, it is possible to reduce time for reactivating the switching power supply 20. Here, 'immediately' means time sufficiently shorter than discharge time of electric charge accumulated in the accumulating capacitor (C3 or C4).

(2) In the above-mentioned embodiment, after the AC power supply is detected (the timing t0 of FIG. 4) and then the DC +3.3 VB reaches the predetermined voltage, if the predetermined period K1 elapses, the control device determines that electric charge has been accumulated in the accumulating capacitor (C3 or C4). However, the present invention is not limited thereto.

For example, after the AC power supply is detected, if the voltage (VL1 or VL2) of a voltage line becomes equal to or higher than a voltage necessary for driving the relay coil 43, the control device may determine that electric charge has been accumulated in the low-capacity power supply circuit 30, without measuring the predetermined period K1. In this case, since it is possible to grasp whether electric charge has been accumulated, on the basis of the voltage, it is possible to more quickly grasp the charging state, as compared to the case of measuring the predetermined period K1.

Alternatively, in a case where a predetermined period elapses after detection of the AC power supply, the control device may determine that electric charge has been accumulated. In this case, even if a circuit for monitoring a charging voltage is not provided, it is possible to simply grasp whether electric charge has been accumulated, by time measurement.

(3) In the above-mentioned embodiment, the control device determines the charging state of the low-capacity power supply circuit 30 on the basis of the first line voltage VL1 of a first line L1 connected to the first accumulating capacitor C3. However, the present invention is not limited, thereto. For example, the control device may determine the charging state of the low-capacity power supply circuit 30, on the basis of the second line voltage VL2 of a second line L2 connected to the second accumulating capacitor C4. Alternatively, it is possible to set a line voltage (V1 or V2) to be detected according to the capacitances of the first accumulating capacitor C3 and the second accumulating capacitor C4. For example, the setting may be performed such that in a case where the capacitance of the first accumulating capacitor C3 is lower than the capacitance of the second accumulating capacitor C4, the second line voltage VL2 is detected.

(4) In the above-mentioned embodiment, the control device 50 may set a predetermined period K4 for detecting the charging of the low-capacity power supply circuit 30 (from the timing t7 to the timing t8 in FIG. 4) to decrease as the duration K3 (the timing t6 to the timing t7 in FIG. 4) of cutoff of the AC power supply VC decreases. In this case, as the duration K3 of cutoff decreases, the discharge amount of the electric charge of the low-capacity power supply circuit 30 is smaller, and thus the charge accumulating period is reduced.

For this reason, the predetermined period K4 is set to decrease as the cutoff duration K3 decreases. Therefore, it is possible to quickly perform reactivation of the switching power supply (the timing t8) (see FIG. 4).

(5) In the above-mentioned embodiment, the power supply system 100 disclosed in this specification is applied to an image forming apparatus. However, the present invention is not limited thereto. The power supply system 100 can be applied to all apparatuses having a normal mode and an OFF mode.

What is claimed is:

1. A power supply system comprising:
a switching power supply configured to convert an AC voltage from an AC power supply into predetermined DC voltages, and outputs the DC voltages;
a switch circuit provided on an AC input line, the switch circuit being configured to be switched on and off and supply AC power to the switching power supply when the switch circuit is turned on, the switch circuit including a switching unit configured to turn on and off the switch circuit;
a low-capacity power supply circuit connected to the AC input line at a front stage of the switch circuit, the low-capacity power supply circuit including a voltage line that is connected to the switching unit and a first accumulating capacitor that is connected to the voltage line, the low-capacity power supply circuit being configured to supply electric power to the switch circuit if the switching power supply is active and supply predetermined electric power if the switching power supply is not used;
a control device configured, to receive the predetermined electric power from the low-capacity power supply circuit; and
a power detecting circuit configured to detect input of the AC power supply to the AC input line,
wherein the switching unit is connected to the voltage line;
wherein when the switching power supply is not used, the control device turns off the switch circuit to stop supply of the AC power to the switching power supply;
wherein the control device determines whether electric charge necessary for controlling the switch circuit has been accumulated in the low-capacity power supply circuit, and turns on the switch circuit if the electric charge necessary for controlling the switch circuit has been accumulated in the low-capacity power supply circuit,
wherein after detection of input of the AC power supply, if a voltage of the voltage line becomes equal to or higher than a voltage necessary for driving the switching unit, the control device determines that the electric charge has been accumulated, and
the control device acquires a line voltage of the voltage line, and determines whether the electric charge has been accumulated, according to the acquired line voltage.

2. The power supply system according to claim 1, wherein after activation of the switching power supply, the switching power supply supplies the electric power to the switch circuit.

3. The power supply system according to claim 2 further comprising a cutoff detecting circuit that detects cutoff of the AC power supply to the AC input line,
wherein, if the cutoff is detected, the control device turns off the switch circuit.

4. The power supply system according to claim 1, wherein after the activation of the switching power supply, if the switch circuit is turned off and then it is immediately required to use the switching power supply, the control device determines that the electric charge has been accumulated.

5. The power supply system according to claim 1, wherein the switch circuit is a self-holding type switch circuit which holds an on state even if electric power is not supplied.

6. The power supply system according to claim 1 further comprising a driving circuit that is provided between the switch circuit and a ground,
wherein the control device controls the drive circuit to be turned on and off, thereby turning on and off the switch circuit.

7. The power supply system according to claim 1, wherein:
the low-capacity power supply circuit is a low-capacity AC to DC converter circuit,
the low-capacity power supply circuit includes:
a first capacitor including a first electrode connected to the AC input line, and a second electrode,
a second capacitor including a first electrode connected to the other end of the AC power supply, and a second electrode,
a rectifier circuit that is electrically connected between the second electrode of the first capacitor and the second electrode of the second capacitor, and is configured to rectify an AC voltage applied between the first capacitor and the second capacitor, and
a smoothing circuit that is connected to the rectifier circuit, and is configured, to smooth the rectified AC voltage to generate a smooth voltage.

8. The power supply system according to claim 1, wherein the switching power supply is used, in a normal mode in which the image forming apparatus performs a printing process, and
the switching power supply is not used in an off mode in which a power supply for the image forming apparatus is applied or power consumption is less than that in the normal mode.

9. The power supply system according to claim 8, wherein:
the image forming apparatus includes a CPU, an operation panel, and a return switch for transition from the off mode to the normal mode, and,
in the normal mode, electric power is supplied from the low-capacity power supply circuit to the CPU, the operation panel, and the return switch.

10. A power supply system comprising:
a switching power supply configured to convert an AC voltage from an AC power supply into predetermined DC voltages, and outputs the DC voltages;
a switch circuit provided on an AC input line, the switch circuit being configured to be switched on and off and supply AC power to the switching power supply when the switch circuit is turned on, the switch circuit including a switching unit configured to turn on and off the switch circuit;
a low-capacity power supply circuit connected to the AC input line at a front stage of the switch circuit, the low-capacity power supply circuit including a voltage line that is connected to the switching unit, a first accumulating capacitor that is connected to a first voltage line, a DC-to-DC converter configured to convert a charging voltage of the first accumulating capacitor into another voltage, and a second accumulating capacitor that is connected to a second voltage line on an output side of the DC-to-DC converter, the low-capacity power supply circuit being configured to supply electric power to the switch circuit if the switching power supply is active and supply predetermined electric power if the switching power supply is not used;

a control device configured, to receive the predetermined electric power from the low-capacity power supply circuit; and a power detecting circuit configured to detect input of the AC power supply to the AC input line, wherein the switching unit is connected to the second voltage line, wherein the control device determines whether electric charge necessary for controlling the switch circuit has been accumulated in the low-capacity power supply circuit according to the acquired second line voltage or first line voltage, and turns on the switch circuit if the electric charge necessary for controlling the switch circuit has been accumulated in the low-capacity power supply circuit, wherein after detection of input of the AC power supply, if a voltage of the voltage line becomes equal to or higher than a voltage necessary for driving the switching unit, the control device determines that the electric charge has been accumulated, and wherein when the switching power supply is not used, the control device turns off the switch circuit to stop supply of the AC power to the switching power supply.

11. The power supply system according to claim 10, wherein after activation of the switching power supply, the switching power supply supplies the electric power to the switch circuit.

12. The power supply system according to claim 11, further comprising a cutoff detecting circuit that detects cutoff of the AC power supply to the AC input line,
   wherein, if the cutoff is detected, the control device turns off the switch circuit.

13. The power supply system according to claim 10, wherein after the activation of the switching power supply, if the switch circuit is turned off and then it is immediately required to use the switching power supply, the control device determines that the electric charge has been accumulated.

14. The power supply system according to claim 10, wherein the switch circuit is a self-holding type switch circuit which holds an on state even if electric power is not supplied.

15. The power supply system according to claim 10, further comprising a driving circuit that is provided between the switch circuit and a ground,
   wherein the control device controls the drive circuit to be turned on and off, thereby turning on and off the switch circuit.

16. The power supply system according to claim 10, wherein:
   the low-capacity power supply circuit is a low-capacity AC to DC converter circuit,
   the low-capacity power supply circuit includes:
      a first capacitor including a first electrode connected to the AC input line, and a second electrode,
      a second capacitor including a first electrode connected to the other end of the AC power supply, and a second electrode,
      a rectifier circuit that is electrically connected between the second electrode of the first capacitor and the second electrode of the second capacitor, and is configured to rectify an AC voltage applied between the first capacitor and the second capacitor, and
      a smoothing circuit that is connected to the rectifier circuit, and is configured, to smooth the rectified AC voltage to generate a smooth voltage.

17. The power supply system according to claim 10, wherein
the switching power supply is used, in a normal mode in which the image forming apparatus performs a printing process, and
the switching power supply is not used in an off mode in which a power supply for the image forming apparatus is applied or power consumption is less than that in the normal mode.

18. The power supply system according to claim 17, wherein:
   the image forming apparatus includes a CPU, an operation panel, and a return switch for transition from the off mode to the normal mode, and,
   in the normal mode, electric power is supplied from the low-capacity power supply circuit to the CPU, the operation panel, and the return switch.

19. A power supply system comprising:
   a switching power supply configured to convert an AC voltage from an AC power supply into predetermined DC voltages, and outputs the DC voltages;
   a switch circuit provided on an AC input line, the switch circuit being configured to be switched on and off and supply AC power to the switching power supply when the switch circuit is turned on;
   a low-capacity power supply circuit connected to the AC input line at a front stage of the switch circuit, the low-capacity power supply circuit being configured to supply electric power to the switch circuit if the switching power supply is active and supply predetermined electric power if the switching power supply is not used;
   a control device configured, to receive the predetermined electric power from the low-capacity power supply circuit;
   a power detecting circuit configured to detect input of the AC power supply to the AC input line;
   a cutoff detecting circuit configured to detect cutoff of the AC power supply to the AC input line; and
   a timer circuit configured to measure the duration of the cutoff, wherein the control device sets the predetermined period to be shorter as the duration decreases;
   wherein when the switching power supply is not used, the control device turns off the switch circuit to stop supply of the AC power to the switching power supply;
   wherein after detection of the AC power supply, if a predetermined period elapses, the control device determines that the electric charge has been accumulated;
   wherein the control device determines whether electric charge necessary for controlling the switch circuit has been accumulated in the low-capacity power supply circuit, and turns on the switch circuit if the electric charge necessary for controlling the switch circuit has been accumulated in the low-capacity power supply circuit.

20. The power supply system according to claim 19, wherein after activation of the switching power supply, the switching power supply supplies the electric power to the switch circuit.

21. The power supply system according to claim 20, further comprising a cutoff detecting circuit that detects cutoff of the AC power supply to the AC input line,
   wherein, if the cutoff is detected, the control device turns off the switch circuit.

22. The power supply system according to claim 19, wherein after the activation of the switching power supply, if the switch circuit is turned off and then it is immediately required to use the switching power supply, the control device determines that the electric charge has been accumulated.

23. The power supply system according to claim 19, wherein the switch circuit is a self-holding type switch circuit which holds an on state even if electric power is not supplied.

24. The power supply system according to claim 19, further comprising a driving circuit that is provided between the switch circuit and a ground,
   wherein the control device controls the drive circuit to be turned on and off, thereby turning on and off the switch circuit.

25. The power supply system according to claim 19, wherein:
   the low-capacity power supply circuit is a low-capacity AC to DC converter circuit,
   the low-capacity power supply circuit includes:
      a first capacitor including a first electrode connected to the AC input line, and a second electrode,
      a second capacitor including a first electrode connected to the other end of the AC power supply, and a second electrode,
      a rectifier circuit that is electrically connected between the second electrode of the first capacitor and the second electrode of the second capacitor, and is configured to rectify an AC voltage applied between the first capacitor and the second capacitor, and
      a smoothing circuit that is connected to the rectifier circuit, and is configured, to smooth the rectified AC voltage to generate a smooth voltage.

26. The power supply system according to claim 19, wherein
   the switching power supply is used, in a normal mode in which the image forming apparatus performs a printing process, and
   the switching power supply is not used in an off mode in which a power supply for the image forming apparatus is applied or power consumption is less than that in the normal mode.

27. The power supply system according to claim 26, wherein:
   the image forming apparatus includes a CPU, an operation panel, and a return switch for transition from the off mode to the normal mode, and,
   in the normal mode, electric power is supplied from the low-capacity power supply circuit to the CPU, the operation panel, and the return switch.

* * * * *